(12) United States Patent
Bourreau et al.

(10) Patent No.: US 12,250,439 B2
(45) Date of Patent: Mar. 11, 2025

(54) MULTI-SENSOR SYSTEM

(71) Applicant: VIAVI Solutions Inc., San Jose, CA (US)

(72) Inventors: Christophe Bourreau, Paris (FR); William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 193 days.

(21) Appl. No.: 17/445,156

(22) Filed: Aug. 16, 2021

(65) Prior Publication Data

US 2022/0070425 A1 Mar. 3, 2022

Related U.S. Application Data

(60) Provisional application No. 62/706,614, filed on Aug. 28, 2020.

(51) Int. Cl.
| | | |
|---|---|---|
| *H04N 23/45* | (2023.01) | |
| *G06V 10/58* | (2022.01) | |
| *G06V 10/60* | (2022.01) | |
| *G06V 20/00* | (2022.01) | |
| *H04N 9/64* | (2023.01) | |
| *H04N 9/77* | (2006.01) | |

(Continued)

(52) U.S. Cl.
CPC ............. *H04N 23/45* (2023.01); *G06V 10/60* (2022.01); *G06V 20/00* (2022.01); *H04N 9/646* (2013.01); *H04N 9/77* (2013.01); *H04N 23/71* (2023.01); *H04N 23/74* (2023.01); *G06V 10/58* (2022.01)

(58) Field of Classification Search
None
See application file for complete search history.

(56) References Cited

U.S. PATENT DOCUMENTS

| | | | | |
|---|---|---|---|---|
| 2009/0021602 A1* | 1/2009 | Fujiwara | ................ | H04N 23/88 |
| | | | | 348/E9.051 |
| 2015/0049211 A1* | 2/2015 | Lim | ....................... | H04N 23/61 |
| | | | | 348/211.1 |
| 2017/0039411 A1* | 2/2017 | Ono | ..................... | G06V 40/193 |

(Continued)

FOREIGN PATENT DOCUMENTS

| | | |
|---|---|---|
| EP | 2890113 A2 | 7/2015 |
| JP | 6574878 B2 | 9/2019 |

OTHER PUBLICATIONS

Sergio M.C. Nascimento, et al.; "Spatial distributions of local illumination color in natural scenes"; Vision Research; 2015; pp. 39-44; vol. 120; The Authors; Elsevier Ltd.

(Continued)

*Primary Examiner* — Quan Pham
(74) *Attorney, Agent, or Firm* — Harrity & Harrity, LLP (57) ABSTRACT

In some implementations, a system may obtain image data associated with a scene. The system may obtain multispectral data associated with the scene. The system may identify one or more objects depicted by the image data. The system may determine representative optical properties of the one or more objects. The system may identify, based on at least one of the image data or the multispectral data, captured optical properties of the one or more objects. The system may generate a color corrected image. The system may provide the color corrected image to a user device for display by the user device.

20 Claims, 9 Drawing Sheets

(51) Int. Cl.
    *H04N 23/71*        (2023.01)
    *H04N 23/74*        (2023.01)

(56) References Cited

U.S. PATENT DOCUMENTS

2017/0053409 A1*   2/2017  Yamamoto ............. G06V 40/10
2018/0309940 A1   10/2018  Okada et al.
2021/0004989 A1*   1/2021  Tanaka .................. H04N 23/88

OTHER PUBLICATIONS

Tajul Miftahushudur, et al.; "Improving Hyperspectral Image Classification Using Data Augmentation of Correlated Color Temperature"; 2019 International Conference on Rada, Antenna, Microwave, Electronics, and Telecommunications; 2019; pp. 126-130; IEEE.
Extended European Search Report for Application No. EP21193410, mailed on Jan. 25, 2022, 14 pages.

* cited by examiner

MULTI-SENSOR SYSTEM

RELATED APPLICATION

This application claims priority to U.S. Provisional Patent Application No. 62/706,614, entitled "MULTI-SENSOR DEVICE FOR MULTISPECTRAL SCENE ANALYSIS," filed on Aug. 28, 2020, the content of which is incorporated by reference herein in its entirety.

BACKGROUND

An image capture device may include an image sensor and various components associated with the image sensor, such as a lens, an aperture, and/or a light source. One example of an image capture device is a user device, such as a smartphone or a tablet. An image capture device may provide various image capture modes, such as a portrait mode, a macro mode, a panoramic mode, among other examples.

SUMMARY

Some implementations described herein relate to a method. The method may include obtaining, by a system, image data associated with a scene. The method may include obtaining, by the system, multispectral data associated with the scene. The method may include identifying, by the system, one or more objects depicted by the image data. The method may include determining, by the system, representative optical properties of the one or more objects. The method may include identifying, by the system and based on at least one of the image data or the multispectral data, captured optical properties of the one or more objects. The method may include generating, by the system and based on the representative optical properties and the captured optical properties, a color corrected image. The method may include providing, by the system, the color corrected image to a user device for display by the user device.

Some implementations described herein relate to a system. The system may include one or more memories and one or more processors communicatively coupled to the one or more memories. The one or more processors may be configured to obtain image data associated with a scene. The one or more processors may be configured to obtain multispectral data associated with the scene. The one or more processors may be configured to identify one or more objects depicted by the image data. The one or more processors may be configured to generate, based on representative optical properties of the one or more objects and captured optical properties of the one or more objects, a color corrected image. The one or more processors may be configured to provide the color corrected image to a user device for display by the user device.

Some implementations described herein relate to a non-transitory computer-readable medium that stores a set of instructions for a system. The set of instructions, when executed by one or more processors of the system, may cause the system to obtain image data associated with a scene. The set of instructions, when executed by one or more processors of the system, may cause the system to obtain multispectral data associated with the scene. The set of instructions, when executed by one or more processors of the system, may cause the system to generate a color corrected image based on the image data and the multispectral data. The set of instructions, when executed by one or more processors of the system, may cause the system to provide the color corrected image.

DETAILED DESCRIPTION

The following detailed description of example implementations refers to the accompanying drawings. The same reference numbers in different drawings may identify the same or similar elements. Some aspects of the following description use a spectrometer as an example. However, the measurement principles, procedures, and methods described herein may be used with any sensor, including but not limited to other optical sensors and spectral sensors.

A multispectral sensor captures multispectral data within specific wavelength ranges across the electromagnetic spectrum. This multispectral data may be useful for various purposes, such as chemical composition analysis of a material, determining an amount and/or type of light that is present at a particular area in a field of view of the multispectral sensor, and/or other examples. In some cases, the multispectral sensor can be used to perform hyperspectral imaging, which uses more spectral bands and/or a tighter grouping of spectral bands than is typically used with multispectral imaging. However, the terms "multispectral" and "hyperspectral" are used interchangeably for the purposes of the implementations described herein.

An image sensor captures image data associated with images in the visible light range (e.g., for user consumption or for use with applications of a user device). In many cases, the image sensor may be associated with a camera of a user device, such as a mobile phone, a laptop, and/or a tablet, among other examples. A processor associated with the user device then processes the image data to perform one or more color adjustment corrections and presents the image data (e.g., via a display of the user device) as an image that appears to be "color corrected" to a user of the user device. However, in some cases, the image sensor may capture image data that contains variations of local illumination within the field of view of the image sensor (e.g., variations due to shading, reflections of light sources, and/or occlusion of light sources, among other examples; variations due to varying amounts and/or locations of light sources; and/or variations due to different types and/or correlated color temperatures (CCTs) of light sources). Consequently, in these cases, the processor is not able to separately address each of the variations of local illumination and, rather, uniformly performs one or more color adjustment corrections on the image data. This causes the processor to present the image data as an image that is color corrected for only a portion of the image (and not color corrected for one or more other portions of the image). For example, when the image data depicts a dimly lit room with a window, where a scene outside the window is brightly lit (e.g., by the sun), the processor may perform one or more color adjustment corrections that may present the room as color corrected, but not the scene outside the window (or vice versa). Even when the processor uses information from an ambient light sensor to identify an average illumination in a particular scene, the processor cannot distinguish variations of local illumination.

Some implementations described herein provide a sensor system comprising a multispectral sensor to capture multispectral data associated with a scene (e.g., reflectance spectral data associated with the scene), an image sensor to capture image data associated with the scene, and a processor to process the multispectral data and the image data to generate a more accurate color corrected image (e.g., an image with multiple color corrected portions, even when the scene includes variations of local illumination). By using a single system to obtain and process the multispectral data and the image data, a size, cost, and/or complexity of the system may be reduced as compared to using separate multispectral devices and image devices to produce similar results. Accordingly, the sensor system may be implemented within a user device, which may not be possible when using separate multispectral devices and image devices. Moreover, using a single system provides consistency and/or accuracy that is not possible when separate multispectral devices and image devices are used.

FIGS. 1A-1F are diagrams of an example implementation 100 described herein. As shown in FIGS. 1A-1F, example implementation 100 includes a sensor system that comprises a multispectral sensor, an image sensor, and a processor. The components of the sensor system, the multispectral sensor, the image sensor, and the processor are described in more detail in connection with FIGS. 2 and 3.

Figure 1A:
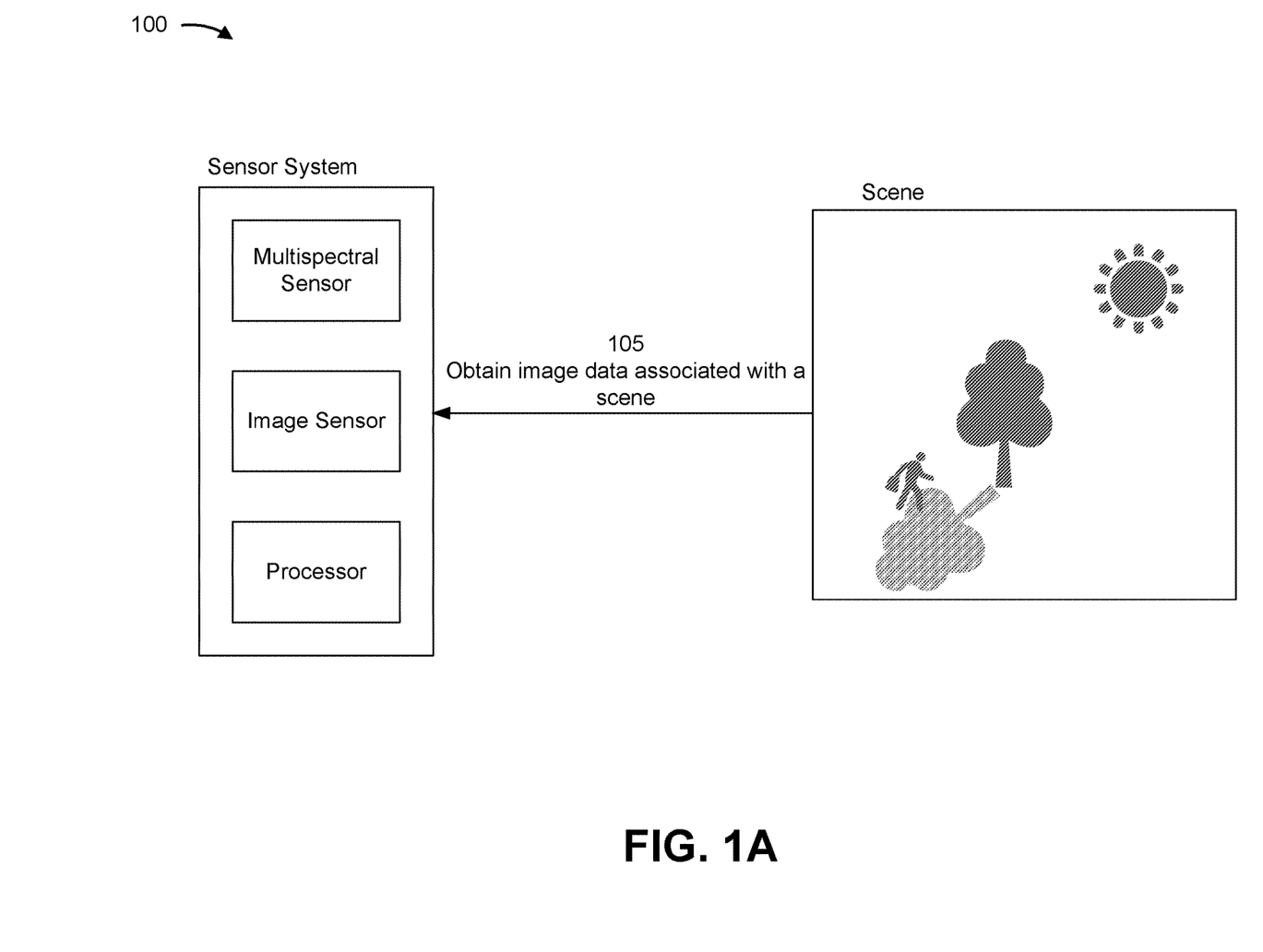
FIGS. 1A-1F are diagrams of an example implementation described herein.

As shown in FIG. 1A and by reference number 105, the sensor system may obtain image data associated with a scene. For example, the image sensor of the sensor system may capture the image data of the scene. The image data may include information about light associated with the scene in the visible spectrum (e.g., an amount and/or location of red light, green light, and/or blue light, sometimes referred to as "RGB light," that is reflected and/or emitted within the scene). In some implementations, as shown in FIG. 1A, the scene may include variations in local illumination (e.g., the scene includes an area associated with a tree illuminated by sunlight, an area associated with a shadow cast by the tree, and an area associated with a person walking by the tree with a part of the person illuminated by the sunlight and another part of the person in the shadow of the tree).

Figure 1B:
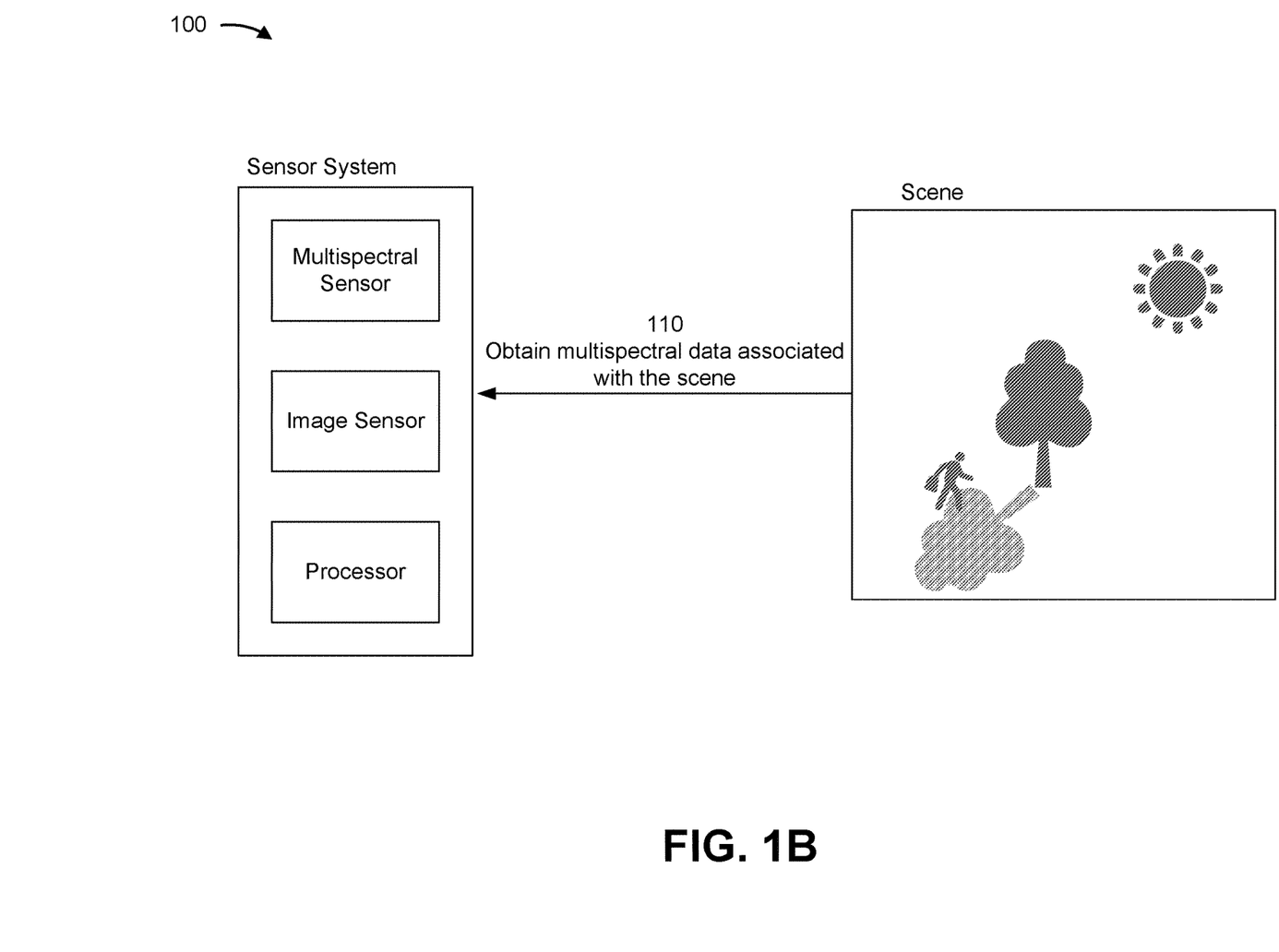

As shown in FIG. 1B, and by reference number 110, the sensor system may obtain multispectral data associated with the scene. For example, the multispectral sensor may capture the multispectral data of the scene. The multispectral data may include information about light associated with the scene in the visible spectrum and/or the non-visible spectrum (e.g., an amount and/or location of visible light, near-infrared (NIR) light, and/or short-wave infrared (SWIR) light, among other examples, that is reflected and/or emitted within the scene).

In some implementations, the sensor system may contemporaneously obtain the image data and the multispectral data (e.g., the processor of the sensor system may send respective commands at essentially the same time to the image sensor and the multispectral image to capture the image data and the multispectral data at the same time or essentially the same time). In some implementations, the sensor system may sequentially obtain the image data and the multispectral data (e.g., the sensor system may obtain the image data and then the multispectral sensor may obtain the multispectral data, or vice versa) within a threshold period of time (e.g., one second).

Figure 1C:
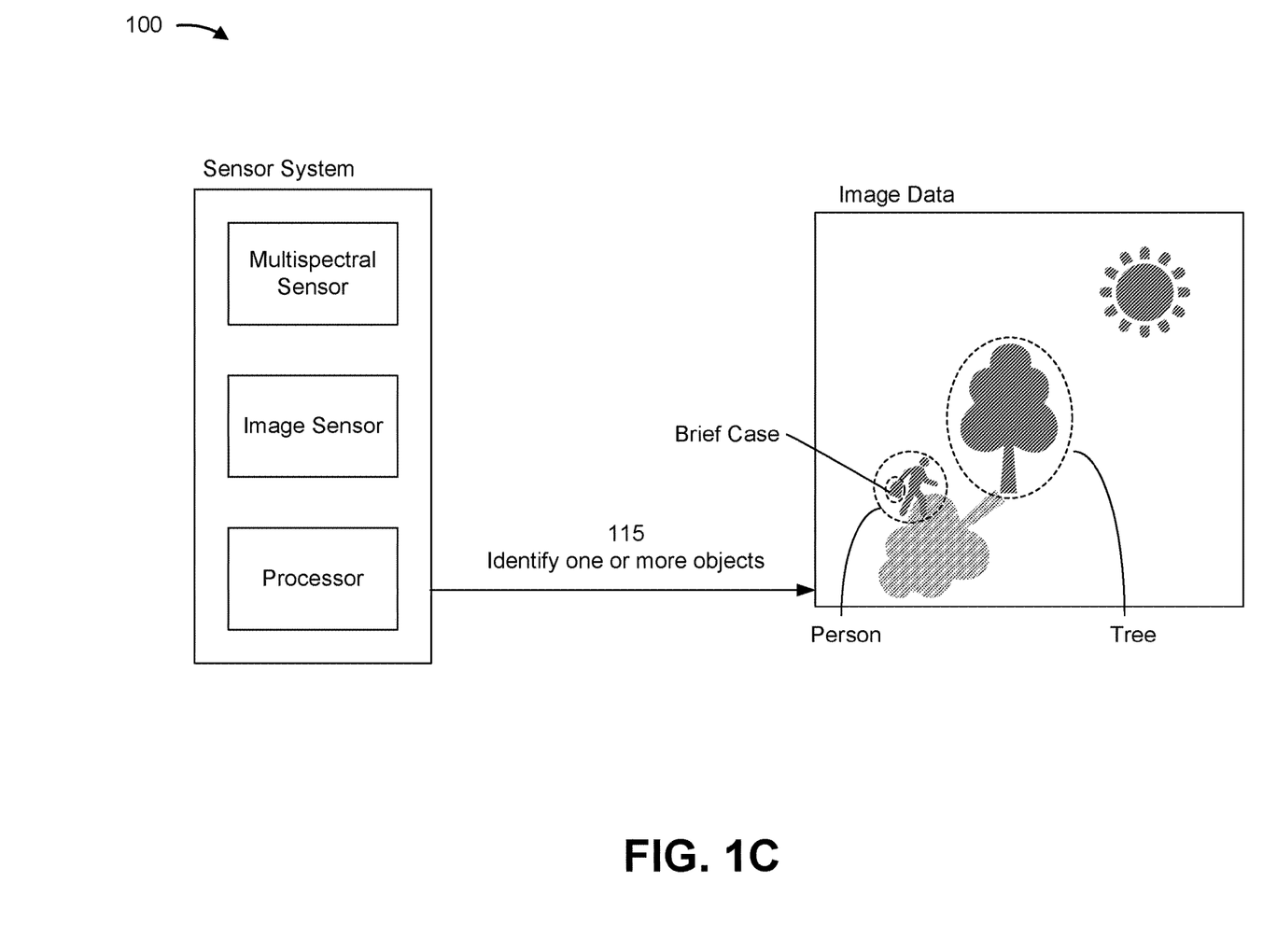

As shown in FIG. 1C, and by reference number 115, the sensor system may identify one or more objects that are depicted by the image data (e.g., one or more objects depicted in an image associated with the image data). For example, the processor may process the image data using an object detection technique (e.g., a single shot detector (SSD) technique, a you only look once (YOLO) technique, and/or a recurrent convolutional neural network (RCNN) technique, among other examples) to detect and identify the one or more objects. For example, as shown in FIG. 1C, the sensor system may identify a person, a briefcase (e.g., that is held by the person), and a tree depicted by the image data.

In some implementations, the processor may process the image data using a machine learning model to identify the one or more objects. The machine learning model may have been trained based on, for example, historical data associated with historical image data (e.g., obtained from multiple image sensors) and/or historical identifications of objects depicted by the image data. Using the historical data as inputs to the machine learning model, the machine learning model may be trained to identify one or more relationships (e.g., between the historical image data and the historical identifications of objects depicted by the image data) for identifying one or more objects.

Additionally, or alternatively, the sensor system may include a light source (e.g., a light emitting diode (LED) or another type of light source) and/or may be associated with the light source (e.g., the sensor system may be electrically and/or communicatively connected to the light source). The sensor system may cause the scene to be illuminated with light from the light source, and the sensor system may obtain additional multispectral data associated with the scene to identify the one or more objects that are depicted by the image data. For example, the light source may emit light associated with a particular wavelength range (e.g., NIR light and/or SWIR light) and the multispectral sensor may capture the additional multispectral data of the scene (e.g., when the scene is illuminated with the emitted light). The additional multispectral data may include respective light information associated with the one or more objects in the scene, and the processor may process (e.g., using spectral composition analysis) the additional multispectral data to identify the one or more objects. For example, for a particular portion of the scene, the processor may perform a lookup operation (e.g., based on light information associated with the particular portion of the scene) in a data structure (e.g., a database, an electronic file, a list, or other examples, that is included in the sensor system or that is accessible to the sensor system) that indicates spectral properties of objects and/or materials for light associated with the particular wavelength range to identify an object associated with the particular portion of the scene. The processor may then identify the one or more other objects in the rest of the scene in a similar manner.

Figure 1D:
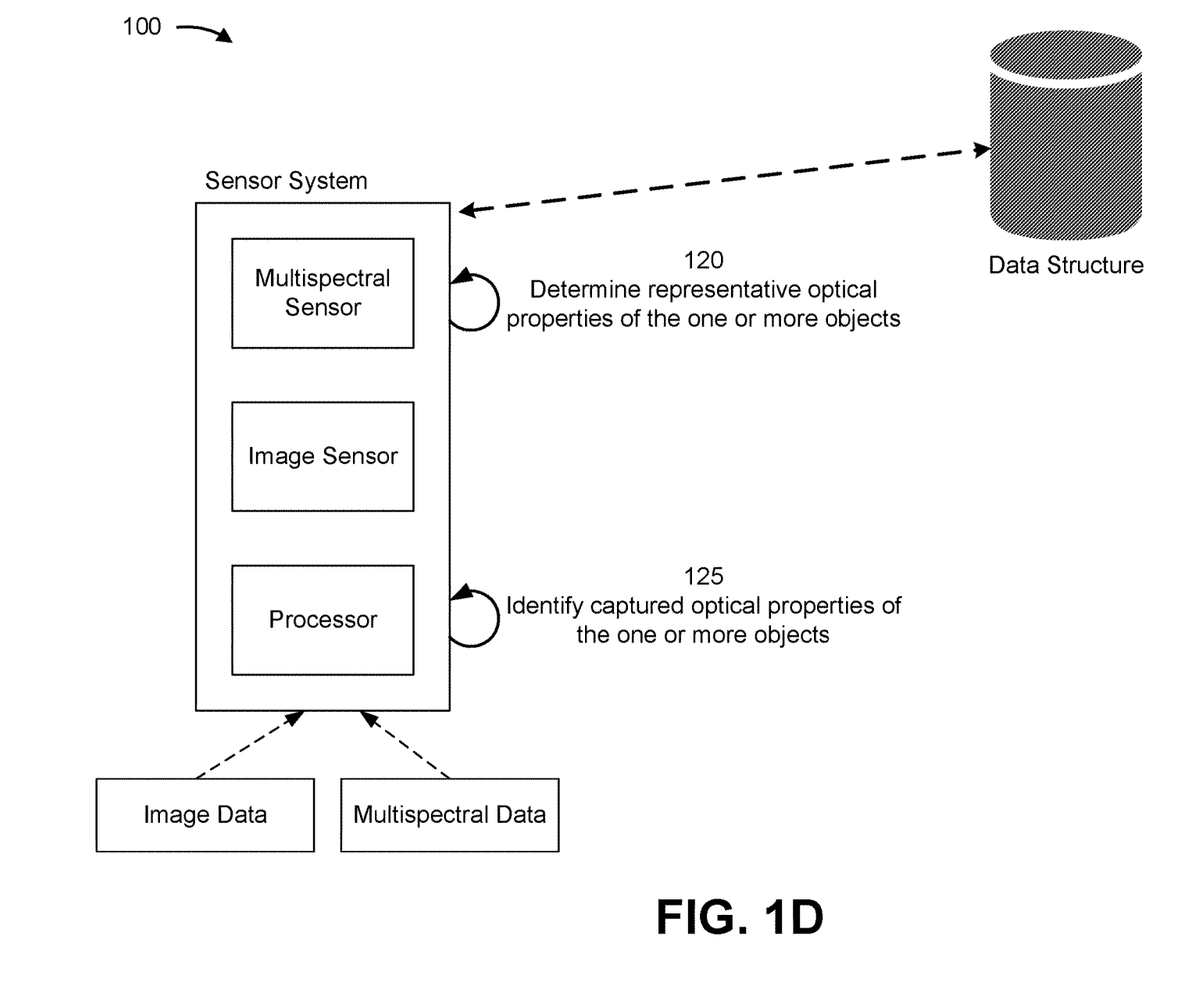

As shown in FIG. 1D, and by reference number 120, the sensor system may determine representative optical properties (also referred to as known or expected reflectance spectra) of the one or more objects that are depicted in the image associated with the image data (e.g., based on identifying the one or more objects as described herein). For example, the processor may identify a data structure (e.g., a database, an electronic file, a list, or other examples, that is included in the sensor system or that is accessible to the sensor system) that indicates representative optical properties of objects (e.g., for light in the visible spectrum and/or the non-visible spectrum). For an object, of the one or more objects identified by the sensor system, the processor may perform a lookup operation (e.g., based on identification information associated with the object) in the data structure to determine the representative optical properties of the object. For example, for the person identified in the image data, the processor may perform a lookup operation in the data structure to determine representative optical properties of the person (e.g., optical properties associated with human skin, optical properties associated with human hair, optical properties associated with textiles, and/or other examples). As another example, for the briefcase identified in the image data, the processor may perform a lookup operation in the data structure to determine representative optical properties of the briefcase (e.g., optical properties associated with leather, synthetic leather, or other materials). In an additional example, for the tree identified in the image data, the processor may perform a lookup operation in the data structure to determine representative optical properties of the tree (e.g., optical properties associated with wood, leaves, fruits, nuts, and/or other examples).

As further shown in FIG. 1D, and by reference number 125, the sensor system may identify captured optical properties (also referred to as measured reflectance spectra) of the one or more objects that are depicted in the image associated with the image data. For example, the processor may process the image data and/or the multispectral data to determine respective captured optical properties of each object of the one or more objects. The optical properties of each object may be associated with light in the visible spectrum and/or the non-visible spectrum.

Figure 1E:
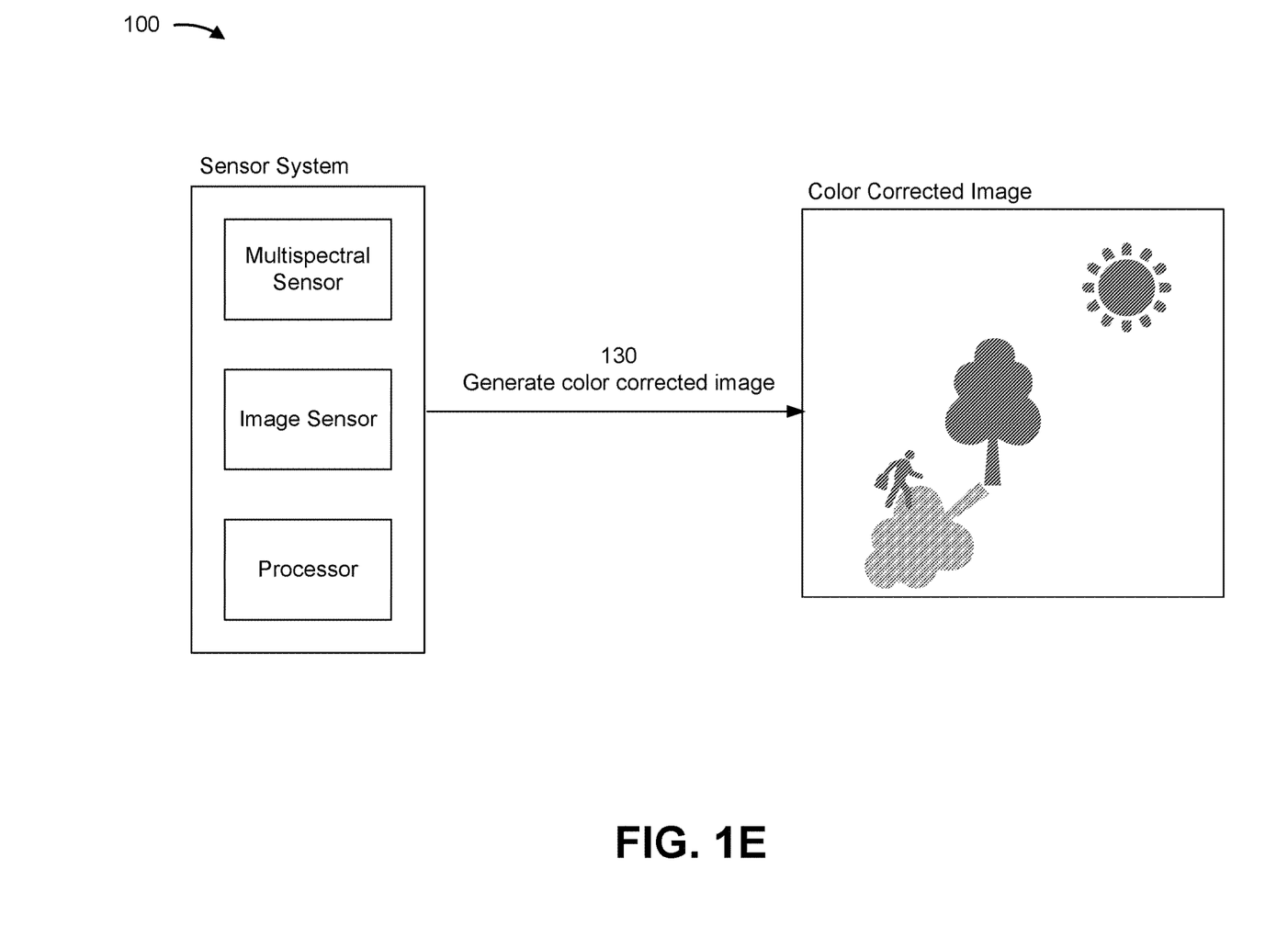

As shown in FIG. 1E, and by reference number 130, the sensor system may generate a color corrected image based on the representative optical properties and the captured optical properties of the one or more objects that are depicted by the image data. For example, the processor may, for each pixel or group of pixels associated with an object in the image data, perform a color adjustment correction based on a difference between representative optical properties and captured optical properties for the pixel or group of pixels associated with the object. Additionally, or alternatively, the sensor system may perform a metameric color spectral analysis on the multispectral data to generate illumination data that identifies one or more illumination sources within the scene, a respective location of the one or more illumination sources within the scene, and/or respective illumination properties of the one or more illumination sources, among other examples. The processor may generate the color corrected image based on the illumination data and/or the representative optical properties and the captured optical properties of the one or more objects that are depicted in the image associated with the image data. In this way, the sensor system may produce a color corrected image that accurately depicts (e.g., in terms of color) the one or more objects.

Figure 1F:
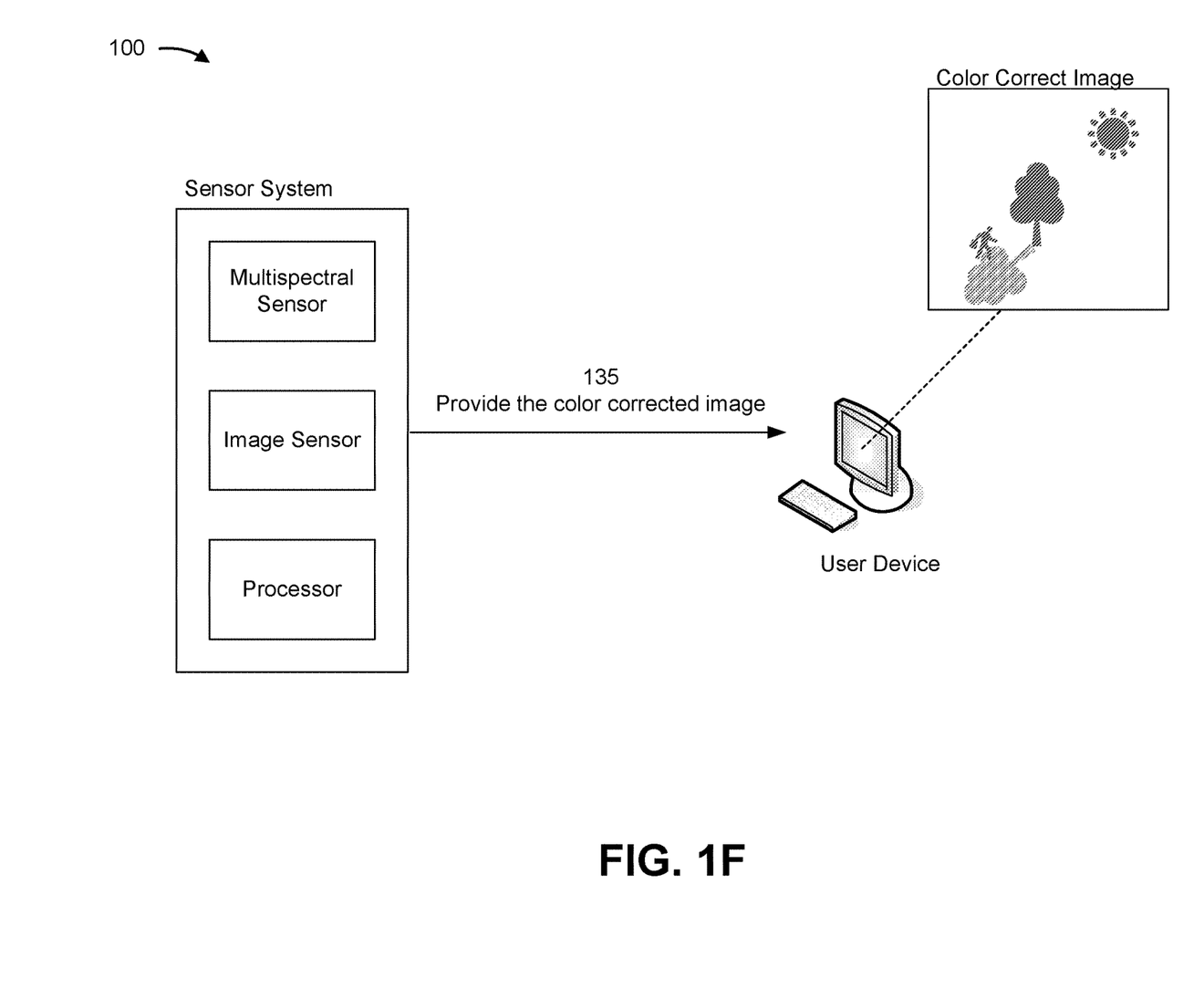

As shown in FIG. 1F, and by reference number 135, the sensor system may provide the color corrected image to a user device for display on the user device. For example, the processor may send the color corrected image to the user device to cause the user device to display the color corrected image on a display of the user device.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
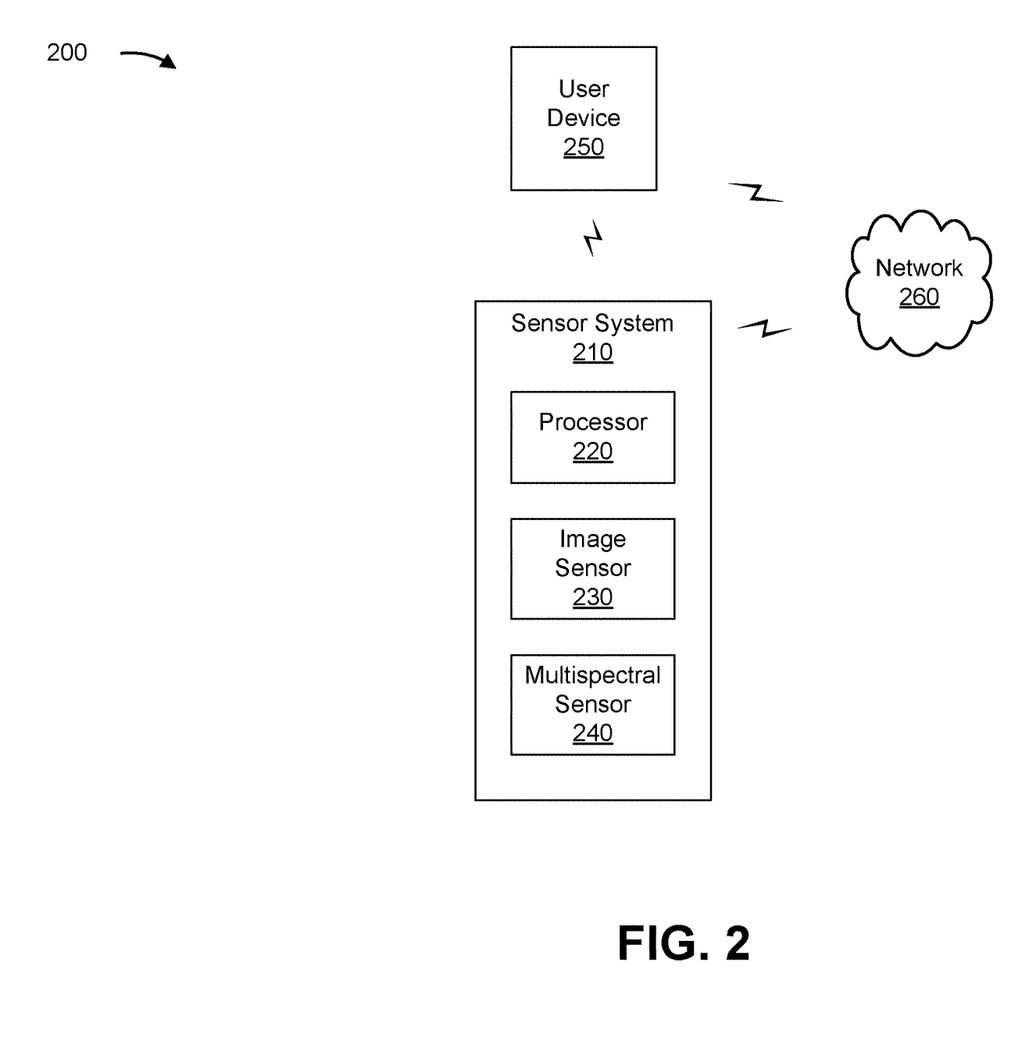
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include sensor system 210, processor 220, image sensor 230, multispectral sensor 240, user device 250, and a network 260. Devices of environment 200 may interconnect via wired connections, wireless connections, or a combination of wired and wireless connections.

As shown in FIG. 2, sensor system 210 may comprise processor 220, image sensor 230, and/or multispectral sensor 240. In some implementations, the sensor system 210 may be included in user device 250.

Processor 220 is implemented in hardware, firmware, and/or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function, such as to process image data and/or multispectral data as described herein.

Image sensor 230 includes a device capable of sensing light (e.g., in the visible spectrum). For example, image sensor 230 may include an image sensor, a multispectral sensor, and/or a spectral sensor, among other examples. In some implementations, image sensor 230 may include a charge-coupled device (CCD) sensor, a complementary metal-oxide semiconductor (CMOS) sensor, a front-side illumination (FSI) sensor, a back-side illumination (BSI) sensor, and/or a similar sensor. In some implementations, image sensor 230 may be included in a camera or a similar device.

Multispectral sensor 240 includes a device capable of sensing light (e.g., in the visible spectrum and/or a nonvisible spectrum). For example, multispectral sensor 240 may include an image sensor, a multispectral sensor, a spectral sensor, and/or the like. In some implementations, multispectral sensor 240 may include a CCD sensor, a CMOS sensor, an FSI sensor, a BSI sensor, and/or a similar sensor.

User device 250 includes one or more devices capable of receiving, generating, storing, processing, and/or providing information as described herein. For example, user device 250 may include a communication and/or computing device, such as a mobile phone (e.g., a smart phone, a radiotelephone, and/or the like), a computer (e.g., a laptop computer, a tablet computer, a handheld computer, and/or the like), a gaming device, a wearable communication device (e.g., a smart wristwatch, a pair of smart eyeglasses, and/or the like), or a similar type of device. In some implementations, user device 250 may receive information from and/or transmit information to sensor system 210 (e.g., via network 260).

Network 260 includes one or more wired and/or wireless networks. For example, network 260 may include a cellular network (e.g., a long-term evolution (LTE) network, a code division multiple access (CDMA) network, a 2G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
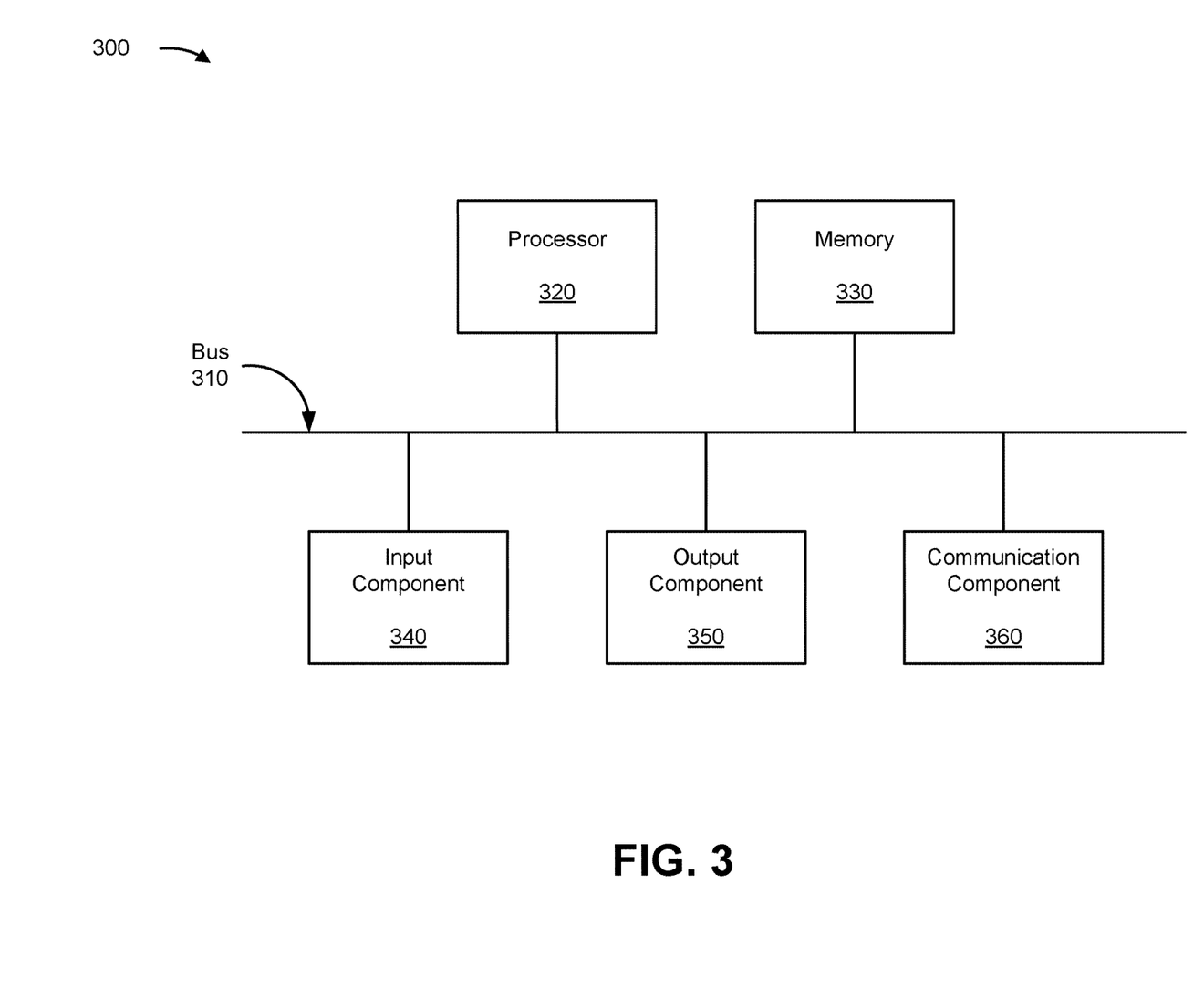
FIG. 3 is a diagram of example components of one or more devices of FIG. 2.

FIG. 3 is a diagram of example components of a device 300, which may correspond to sensor system 210, processor 220, image sensor 230, multispectral sensor 240, and/or user device 250. In some implementations, sensor system 210, processor 220, image sensor 230, multispectral sensor 240, and/or user device 250 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
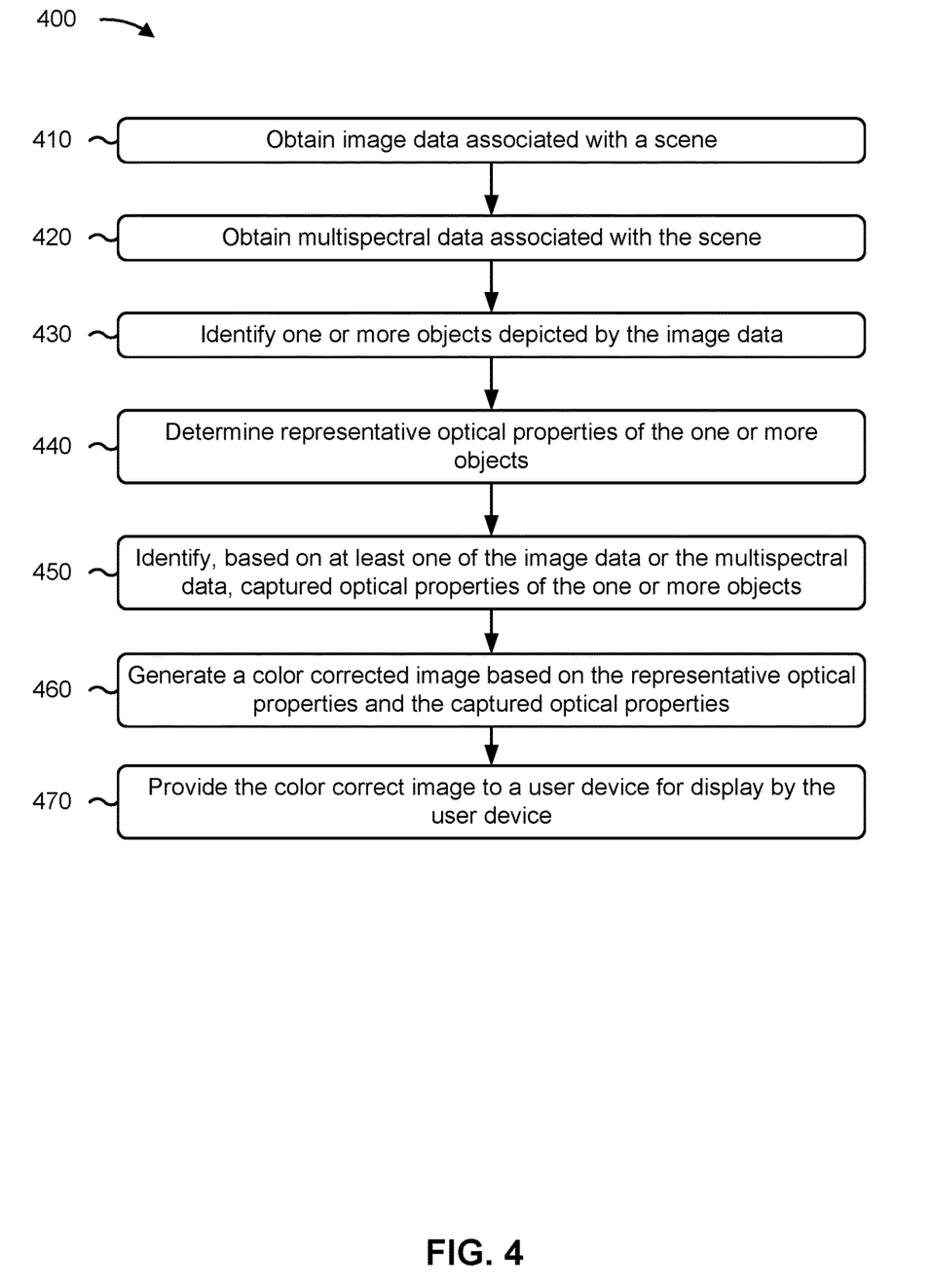
FIG. 4 is a flow chart of an example process relating to generating a color corrected image.

FIG. 4 is a flowchart of an example process 400 relating to generating a color corrected image. In some implementations, one or more process blocks of FIG. 4 may be performed by a device (e.g., sensor system 210). In some implementations, one or more process blocks of FIG. 4 may be performed by another device or a group of devices separate from or including the sensor system, such as processor 220, image sensor 230, multispectral sensor 240, and/or user device 250. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include obtaining image data associated with a scene (block 410). For example, the device may obtain image data associated with a scene, as described above.

As further shown in FIG. 4, process 400 may include obtaining multispectral data associated with the scene (block 420). For example, the device may obtain multispectral data associated with the scene, as described above.

As further shown in FIG. 4, process 400 may include identifying one or more objects depicted by the image data (block 430). For example, the device may identify one or more objects depicted by the image data, as described above.

As further shown in FIG. 4, process 400 may include determining representative optical properties of the one or more objects (block 440). For example, the device may determine representative optical properties of the one or more objects, as described above.

As further shown in FIG. 4, process 400 may include identifying, based on at least one of the image data or the multispectral data, captured optical properties of the one or more objects (block 450). For example, the device may identify, based on at least one of the image data or the multispectral data, captured optical properties of the one or more objects, as described above.

As further shown in FIG. 4, process 400 may include generating a color corrected image based on the representative optical properties and the captured optical properties (block 460). For example, the device may generate a color corrected image based on the representative optical properties and the captured optical properties, as described above.

As further shown in FIG. 4, process 400 may include providing the color corrected image to a user device for display by the user device (block 470). For example, the device may provide the color corrected image to a user device for display by the user device, as described above.

Process 400 may include additional implementations, such as any single implementation or any combination of implementations described below and/or in connection with one or more other processes described elsewhere herein.

In a first implementation, the image data and the multispectral data are obtained contemporaneously.

In a second implementation, alone or in combination with the first implementation, the image data is obtained by an image sensor associated with the system and the multispectral data is obtained by a multispectral sensor associated with the system.

In a third implementation, alone or in combination with one or more of the first and second implementations, identifying the one or more objects depicted by the image data includes processing the image data using an image processing technique to identify the one or more objects.

In a fourth implementation, alone or in combination with one or more of the first through third implementations, identifying the one or more objects depicted by the image data includes processing the image data using a machine learning model to identify the one or more objects.

In a fifth implementation, alone or in combination with one or more of the first through fourth implementations, identifying the one or more objects depicted by the image data includes causing the scene to be illuminated by a light source associated with the system, obtaining additional multispectral data when the scene is illuminated by the light source, and processing the additional multispectral data using a spectral composition analysis technique to identify the one or more objects.

In a sixth implementation, alone or in combination with one or more of the first through fifth implementations, determining the representative optical properties of the one or more objects includes performing, based on identifying the one or more objects, a lookup operation in a data structure to determine the representative optical properties of the one or more objects.

In a seventh implementation, alone or in combination with one or more of the first through sixth implementations, generating the color corrected image includes performing a color adjustment correction on the image data based on a difference between the representative optical properties and the captured optical properties of the one or more objects.

In an eighth implementation, alone or in combination with one or more of the first through seventh implementations, generating the color corrected image includes processing the multispectral data using a metameric color spectral analysis to generate illumination data; and generating the color corrected image based on the illumination data, the representative optical properties, and the captured optical properties of the one or more objects.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
   obtaining, by a system, image data associated with a scene;
   obtaining, by the system, multispectral data associated with the scene;
   identifying, by the system, one or more objects depicted by the image data;
   performing, by the system and after identifying the one or more objects, a lookup operation in a data structure to determine representative optical properties of the one or more objects, wherein the data structure includes information identifying:
   a first optical property associated with at least a portion of an object, of the one or more objects, being of a first type of material, and
   a second optical property associated with at least the portion of the object being of a second type of material that is an alternative to the first type of material for the portion of the object;
identifying, by the system and based on at least one of the image data or the multispectral data, captured optical properties of the one or more objects;
processing the multispectral data to generate illumination data that identifies one or more of
   one or more illumination sources that illuminate the one or more objects within the scene,
   one or more locations of the one or more illumination sources that illuminate the one or more objects within the scene, or
   one or more illumination properties of the one or more illumination sources that illuminate the one or more objects within the scene;
generating, by the system, a color corrected image by performing a color adjustment correction on the image data based on the illumination data and a difference between the representative optical properties and the captured optical properties; and
providing, by the system, the color corrected image to a user device for display by the user device.

2. The method of claim 1, wherein the image data and the multispectral data are obtained contemporaneously.

3. The method of claim 1, wherein the image data is obtained by an image sensor associated with the system and the multispectral data is obtained by a multispectral sensor associated with the system.

4. The method of claim 1, wherein identifying the one or more objects depicted by the image data comprises:
   processing the image data using an image processing technique to identify the one or more objects.

5. The method of claim 1, wherein identifying the one or more objects depicted by the image data comprises:
   processing the image data using a machine learning model to identify the one or more objects.

6. The method of claim 1, wherein identifying the one or more objects depicted by the image data comprises:
   causing the scene to be illuminated;
   obtaining additional multispectral data when the scene is illuminated; and
   processing the additional multispectral data using a spectral composition analysis technique to identify the one or more objects.

7. The method of claim 1, wherein the representative optical properties include known or expected properties of the one or more objects.

8. The method of claim 1, wherein the second type of material is a synthetic version of the first type of material.

9. A system, comprising:
   one or more memories; and
   one or more processors communicatively coupled to the one or more memories, configured to:
      obtain image data associated with a scene;
      obtain multispectral data associated with the scene;
      identify one or more objects depicted by the image data;
      perform, based on the one or more objects being identified, a lookup operation in a data structure to determine representative optical properties of the one or more objects,
      wherein the data structure includes information identifying:
         a first optical property associated with at least a portion of an object, of the one or more objects, being of a first type of material, and
         a second optical property associated with at least the portion of the object being of a second type of material that is an alternative to the first type of material for the portion of the object;
      generate, based on the multispectral data, illumination data that identifies one or more of:
         an illumination source that illuminates the one or more objects within the scene,
         a location of the illumination source, or
         one or more illumination properties of the illumination source;
      perform, based on the illumination data and a difference between the representative optical properties of the one or more objects and captured optical properties of the one or more objects, a color adjustment correction on the image data to generate a color corrected image; and
      provide the color corrected image to a user device for display by the user device.

10. The system of claim 9, wherein the one or more processors, to obtain the image data is obtained, are configured to:
   obtain the image data using an image sensor associated with the system; and
   wherein the one or more processors, to obtain the multispectral data is obtained, are configured to:
   obtain the multispectral data using a multispectral sensor associated with the system.

11. The system of claim 9, wherein the one or more processors, to identify the one or more objects depicted by the image data, are configured to:
   process the image data using at least one of:
      an image processing technique to identify the one or more objects; or
      a machine learning model to identify the one or more objects.

12. The system of claim 9, wherein the one or more processors, to identify the one or more objects depicted by the image data, are configured to:
   obtain additional multispectral data with the scene; and
   process the additional multispectral data to identify the one or more objects.

13. The system of claim 9, wherein the one or more processors, to perform the color adjustment correction on the image data, are configured to:
   identify, based on at least one of the image data or the multispectral data, the captured optical properties of the one or more objects; and
   perform the color adjustment correction on the image data based on the captured optical properties of the one or more objects being identified.

14. The system of claim 9, wherein the second type of material is a synthetic version of the first type of material.

15. The system of claim 9, wherein the one or more processors, to obtain the image data and the multispectral data, are configured to:
   obtain the image data and the multispectral data contemporaneously.

16. The system of claim 9, wherein the one or more processors, to identify the one or more objects depicted by the image data, are configured to:
- cause the scene to be illuminated;
- obtain additional multispectral data when the scene is illuminated; and
- process the additional multispectral data using a spectral composition analysis technique to identify the one or more objects.

17. A non-transitory computer-readable medium storing a set of instructions, the set of instructions comprising:
- one or more instructions that, when executed by one or more processors of a system, cause the system to:
  - obtain image data associated with a scene;
  - identify one or more objects depicted by the image data;
  - perform, based on the one or more objects being identified, a lookup operation in a data structure to determine representative optical properties of the one or more objects,
    - wherein the data structure includes information identifying:
      - a first optical property associated with at least a portion of an object, of the one or more objects, being of a first type of material, and
      - a second optical property associated with at least the portion of the object being of a second type of material that is an alternative to the first type of material for the portion of the object;
  - generate, based on multispectral data associated with the scene, illumination data that identifies one or more of:
    - an illumination source that illuminates the one or more objects within the scene,
    - a location of the illumination source, or
    - one or more illumination properties of the illumination sources;
  - perform, based on the illumination data and a difference between the representative optical properties of the one or more objects and captured optical properties of the one or more objects, a color adjustment correction on the image data to generate a color corrected image; and
  - provide the color corrected image.

18. The non-transitory computer-readable medium of claim 17, wherein the one or more instructions, that cause the system to obtain the image data, cause the system to:
- obtain the image data using an image sensor associated with the system; and
- wherein the one or more instructions, that cause the system to obtain the multispectral data, cause the system to:
  - obtain the multispectral data using a multispectral sensor associated with the system.

19. The non-transitory computer-readable medium of claim 17, wherein the one or more instructions, that cause the system to perform the color adjustment correction on the image data, cause the system to:
- identify, based on at least one of the image data or the multispectral data, the captured optical properties of the one or more objects; and
- perform the color adjustment correction on the image data based on the captured optical properties of the one or more objects being identified.

20. The non-transitory computer-readable medium of claim 17, wherein the second type of material is a synthetic version of the first type of material.

* * * * *